United States Patent
Yatabe et al.

(10) Patent No.: US 8,600,177 B2
(45) Date of Patent: Dec. 3, 2013

(54) IMAGE CODING APPARATUS

(75) Inventors: Yusuke Yatabe, Yokohama (JP); Hironori Komi, Tokyo (JP); Mitsuhiro Okada, Yokohama (JP); Tomoyuki Myojin, Tachikawa (JP); Hiroki Mizosoe, Kawasaki (JP)

(73) Assignee: Hitachi Consumer Electronics Co., Ltd, Tokyo (JP)

( * ) Notice: Subject to any disclaimer, the term of this patent is extended or adjusted under 35 U.S.C. 154(b) by 80 days.

(21) Appl. No.: 12/952,875

(22) Filed: Nov. 23, 2010

(65) Prior Publication Data

US 2011/0243468 A1    Oct. 6, 2011

(30) Foreign Application Priority Data

Mar. 31, 2010    (JP) ................. 2010-080105

(51) Int. Cl.
*G06K 9/46* (2006.01)
*H04B 1/66* (2006.01)

(52) U.S. Cl.
USPC ........................... 382/236; 375/240

(58) Field of Classification Search
USPC ........................... 375/240; 382/236
See application file for complete search history.

(56) References Cited

U.S. PATENT DOCUMENTS

| | | | | |
|---|---|---|---|---|
| 5,805,223 | A | * | 9/1998 | Shikakura et al. ........ 375/240.12 |
| 2006/0282874 | A1 | * | 12/2006 | Ito et al. ........................ 725/139 |
| 2009/0016621 | A1 | * | 1/2009 | Nakagawa et al. ........... 382/236 |
| 2009/0028246 | A1 | * | 1/2009 | Miyoshi et al. .......... 375/240.16 |
| 2011/0235929 | A1 | * | 9/2011 | Mizosoe et al. .............. 382/236 |

FOREIGN PATENT DOCUMENTS

| | | | |
|---|---|---|---|
| EP | 1793608 | A1 * | 6/2007 |
| JP | 06-110831 | | 4/1994 |

* cited by examiner

*Primary Examiner* — Utpal Shah
(74) *Attorney, Agent, or Firm* — McDermott Will & Emery LLP (57) ABSTRACT

A refresh area is taken advantage of when a series of images are coded using Intra-frame coding and Inter-frame coding, a partial area of an image being forcefully Intra-frame coded (Intra MBs) in the refresh area. As the prediction mode for prediction of the Intra MBs inside the refresh area, a prediction mode is selected where the prediction is executable based on only the image that exists inside the refresh area.

6 Claims, 9 Drawing Sheets

CASE WHERE THE IMAGE IS SLICED ON 1-MB-LINE BASIS    403 REFRESH AREA 401  402

404

THE PREDICTION MODE WHICH SHOULD BE SELECTED FOR THE INTRA-PREDICTION SUB BLOCKS INSIDE THE REFRESH AREA IS A PREDICTION MODE WHERE THE PREDICTION FROM THE OUTSIDE OF THE REFRESH AREA IS NOT EXECUTED. IN THE PRESENT EXAMPLE, THE PREDICTION MODE FOR THE OBLIQUE-LINE SUB BLOCKS IS A LONGITUDINAL-DIRECTION PREDICTION MODE.

FIG. 4B

CASE WHERE THE IMAGE IS SLICED ON PLURAL-MBS-LINES BASIS

REFRESH AREA

405

THE PREDICTION MODE WHICH SHOULD BE SELECTED FOR THE INTRA-PREDICTION SUB BLOCKS INSIDE THE REFRESH AREA IS A PREDICTION MODE WHERE THE PREDICTION FROM THE OUTSIDE OF THE REFRESH AREA IS NOT EXECUTED. IN THE PRESENT EXAMPLE, THE PREDICTION MODE FOR THE OBLIQUE-LINE SUB BLOCKS IS A TRANSVERSE-DIRECTION PREDICTION MODE.

FIG.5

FIG.6A  FIG.6B  FIG.6C  FIG.6D
MODE 0  MODE 1  MODE 2  MODE 3

FIG.6E  FIG.6F  FIG.6G  FIG.6H  FIG.6I
MODE 4  MODE 5  MODE 6  MODE 7  MODE 8

☐ PREDICTION-TARGETED PIXEL
▓ ALREADY-CODED PIXEL

FIG.7A

CASE WHERE A REFRESH AREA IS SET UP IN THE TRANSVERSE DIRECTION

THE REFRESH AREA, WHERE PICTURES ARE FORCEFULLY INTRA-FRAME CODED IS SET UP. THEN, THE REFRESH AREA IS DISPLACED ON EACH PICTURE BASIS, THEREBY EXECUTING THE REFRESH.

FIG.7B

THE REFRESH AREA, WHERE PICTURES ARE FORCEFULLY INTRA-FRAME CODED IS SET UP ON EACH PICTURE BASIS. MOREOVER, THE REFRESH AREA IS DISPLACED ON EACH IMAGE BASIS, THEREBY PREVENTING ACCUMULATION OF THE ERRORS.

CASE WHERE A REFRESH AREA IS SET UP IN THE LONGITUDINAL DIRECTION

FIG.8A

REFRESH BASED ON I-PICTURES

FIG.8B

REFRESH BASED ON INTRA MBS

FIG.9

THE INTRA / INTER PREDICTIONS ARE SELECTED AT RANDOM IN BOUNDARY MBS (I.E., OBLIQUE-LINE MBS IN THE DRAWING) WHICH ARE IN CONTACT WITH THE REFRESH AREA

REFRESH AREA

FIG.10

IMAGE CODING APPARATUS

INCORPORATION BY REFERENCE

The present application claims priority from Japanese application JP 2010-080105 filed on Mar. 31, 2010, the content of which is hereby incorporated by reference into this application.

BACKGROUND OF THE INVENTION

The present invention relates to an image coding apparatus and method which allows an image to be transferred with a low delay.

In JP-A-6-110831, the disclosure has been made concerning a data transfer apparatus for performing the data-packet transfer between communications modules via a serial bus. Moreover, an object of this data transfer apparatus is to make the higher-speed transfer capability available even in a case where the signal-line number and clock rate are the same as the bus width of the serial transfer.

SUMMARY OF THE INVENTION

In order to code an image, and to transfer the coded image with a low delay, the proposal has been also made concerning a scheme for using the Intra-frame coding forcefully with respect to a partial area at the time of the image coding, and thereby performing the refresh of the partial area. No consideration, however, has been given to a case where the Intra-frame coding is used in an environment such as wireless transmission where a stream error occurs. Accordingly, there is an apprehension that the transmitted image becomes highly likely to collapse.

The present invention relates to an image coding apparatus which makes it possible to suppress the collapse of a reproduced image even in the case where the stream error occurs many times.

In view of the above-described object, the present applied invention provides configurations which are disclosed in the appended claims, for example.

According to the present invention, it becomes possible to provide the image coding apparatus which makes it possible to suppress the collapse of a displayed image even in the case where, in the low-delay image transmission, the stream error occurs many times.

Other objects, features and advantages of the invention will become apparent from the following description of the embodiments of the invention taken in conjunction with the accompanying drawings.

DETAILED DESCRIPTION OF THE INVENTION

Hereinafter, the explanation will be given below concerning the coding scheme in a manner where the H.264 coding, i.e., the international standardization scheme for the video-image coding, is selected as its example.

Figure 3:
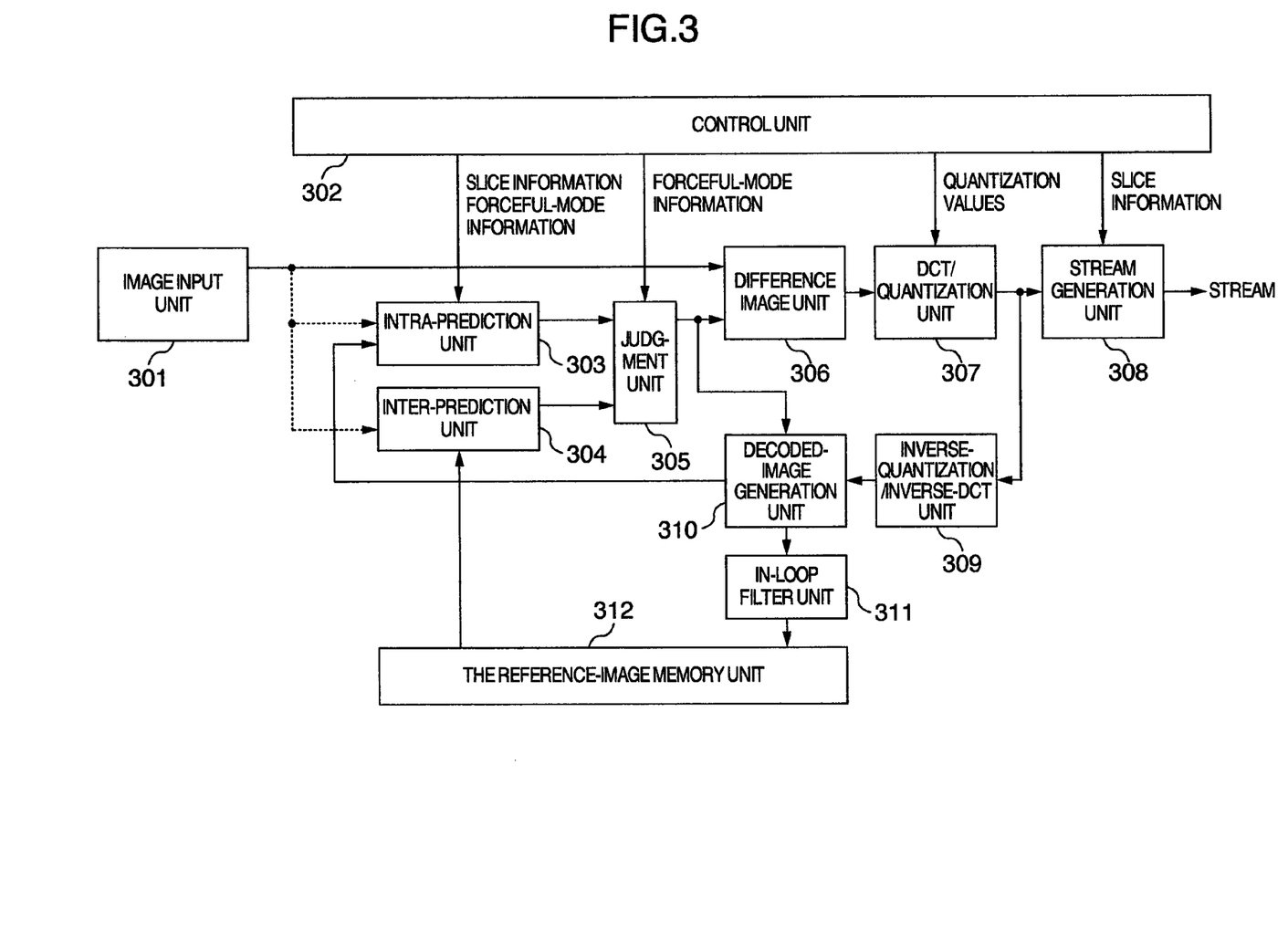
FIG. 3 is a diagram for illustrating a configuration example of the image coding apparatus.

FIG. 3 is a diagram for illustrating a configuration example of the image coding apparatus.

The image coding apparatus includes the following configuration components: An Intra-prediction unit 303 for making the Intra prediction about an inputted image inputted from an image input unit 301, an Inter-prediction unit 304 for making the Inter prediction thereabout, a judgment unit 305 for making a judgment as to whether the prediction is the Intra prediction or the Inter prediction, a difference image unit 306 for generating an error image by assuming the difference between the inputted image and the prediction image judged by the judgment unit 305, a DCT/quantization unit 307 for performing the DCT/quantization with respect to the error image, a stream generation unit 308 for forming, into bit streams, the quantized image information and sub information necessary for the coding, an inverse-quantization/inverse-DCT unit 309 for performing the local decoding, a decoded-image generation unit 310 for generating a decoded image, an in-loop filter unit 311 for performing the in-loop filtering with respect to the decoded image, a the reference-image memory unit 312 for storing images after being subjected to the in-loop filtering, and a control unit 302 for controlling the respective blocks.

In this configuration diagram, the respective components are informed of the following information from the control unit 302. The Intra-prediction unit 303 is informed of information on slice structure and forceful-mode information on the Intra prediction. The DCT/quantization unit 307 is informed of quantization values. The judgment unit 305 is informed of the forceful-mode information for implementing the Intra prediction forcefully. The stream generation unit 308 is informed of the slice-structure information. In this way, this configuration is implemented such that, at the time of the coding, it is possible to forcefully set the prediction modes of the Intra prediction, the quantization value on each MB: (macroblock) basis, and slice partition information when coding a frame.

An object to be accomplished in the present example is to implement the image transmission with a low delay. The low-delay implementation of image information refers to the following system as its one example: Namely, in this system, an image inputted from a camera is compressed so as to reduce the image's data amount. Moreover, the compressed data is transferred via wireless communications. Finally, the transferred data is decoded on the reception side, thereby being reproduced. It is said that performing the image transmission without feeling a sense of strangeness on the transmission/reception sides requires that the delay be made equal to, e.g., 100 ms or lower.

Furthermore, when realizing the low-delay implementation like this, there arises a necessity for satisfying the following conditions at the time of the image coding:

(1) The system is configured with I-pictures and P-pictures without using bidirectional prediction pictures (i.e., B-pictures) which cause a reorder ring to occur at the time of the image compression/extension.

(2) The coding amount of each image is limited in such a manner that it does not exceed the transmission rate of a transmission line concerned.

Namely, if the coding amount of a single piece of image is large, a time is needed for transmitting and decoding this image. This fact makes it impossible to realize the low-delay implementation.

Figure 7A:
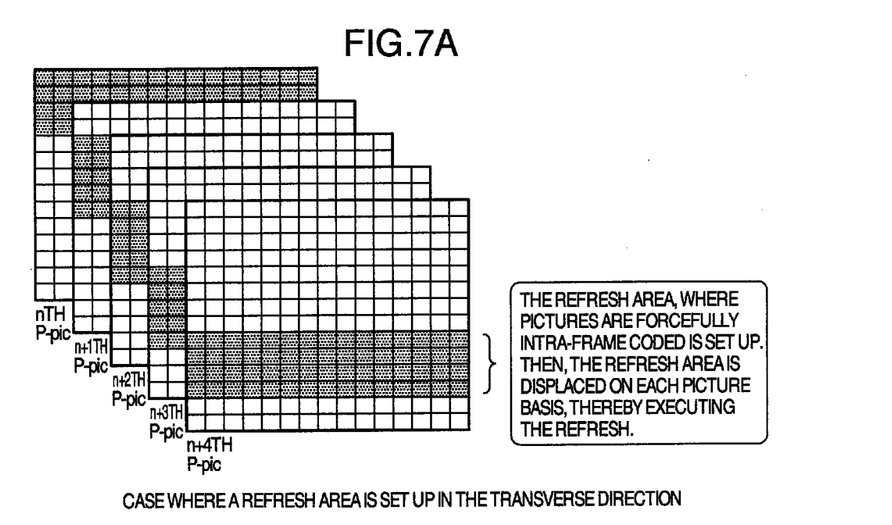
FIGS. 7A and 7B are conceptual diagrams for explaining the refresh area.
Figure 7B:
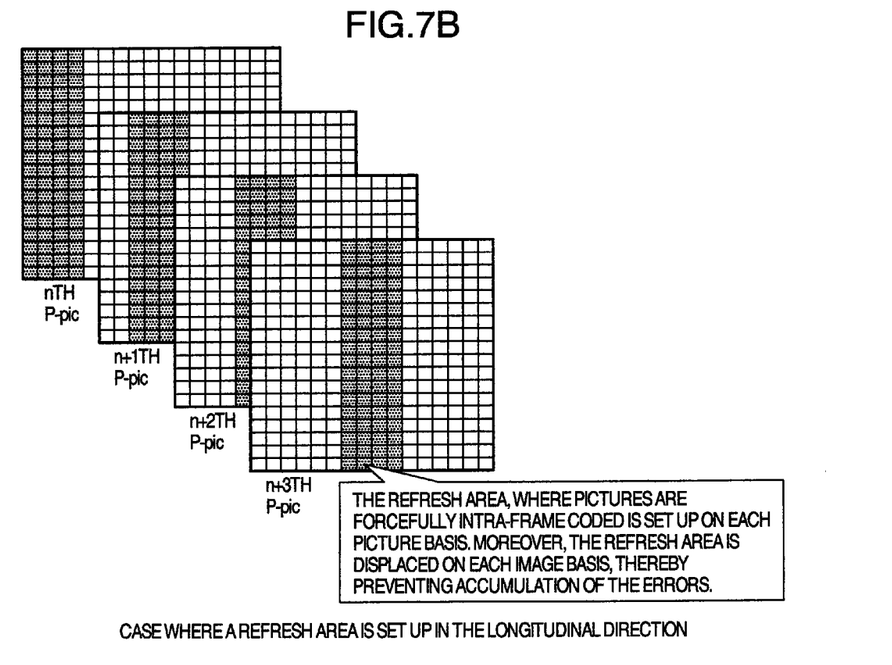

In order to address the present object, the following countermeasure is effective: Namely, the P-pictures, which are based on the Inter-frame coding scheme, are continued without periodically using the I-pictures whose single piece of coding amount is large. Moreover, a partial area of the P-pictures is forcefully I-picture-equivalent Intra-frame coded (i.e., formation of a refresh area), thereby resetting accumulation of the errors. FIGS. 7A and 7B are conceptual diagrams for explaining the refresh area.

In the case of coding a series of images, the I-picture is positioned at its front head. The respective pictures subsequent to this I-picture are Inter-frame coded (i.e., formation of the P-pictures). Then, a partial area of the P-pictures is defined as the refresh area which is based on the Intra-frame coding (i.e., formation of Intra MBs). Furthermore, this refresh area is displaced thereinafter, thereby implementing the refresh without using the I-pictures. The left-side drawing illustrates a case where the refresh area is set up in the transverse direction. The right-side drawing illustrates a case where the refresh area is set up in the longitudinal direction.

The range of this refresh area is set more widely than the range of the motion prediction at the time of making the Inter prediction. This setting makes it possible to prevent the propagation of errors due to the motion prediction. Setting the range like this makes it possible to uniformalize the coding amount for the single piece of picture, thereby allowing the accomplishment of the low-delay implementation.

Figure 8A:
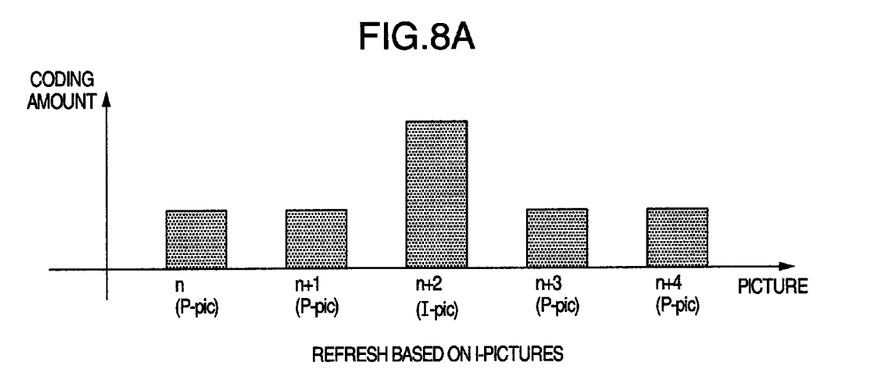
FIGS. 8A and 8B are diagrams for illustrating examples of the relationship between the coding amount and the refresh area.
Figure 8B:
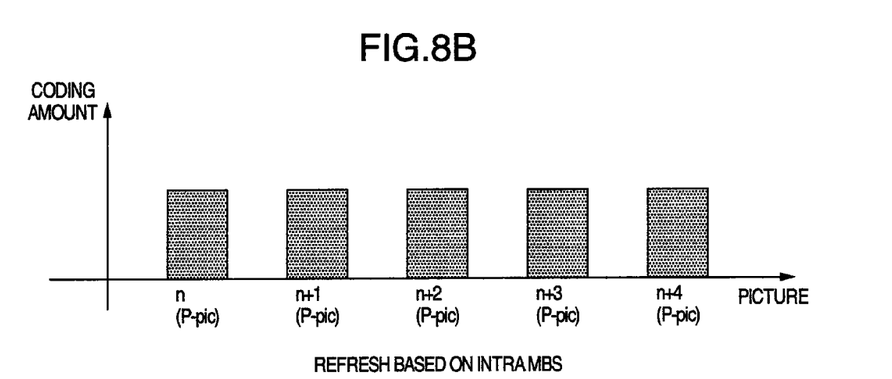

FIGS. 8A and 8B are diagrams for illustrating examples of the relationship between the coding amount and the refresh area. When the refresh is performed by periodically using the I-pictures all of which are based on the Intra-frame coding, the large coding amount occurs at the position of each I-picture. On account of this fact, it takes so much time to code this I-picture. Simultaneously, if the coding amount exceeds the transmission rate of the transmission line, a delay takes place in the process of transmitting the I-picture. As a result, it becomes impossible to implement the low-delay image transmission. Conversely, when trying to code the I-picture under a condition that the coding amount is made smaller than the transmission rate, the coding amount becomes lowered. This condition deteriorates the picture quality of the I-picture, thereby resulting in a deterioration in the quality of the displayed image. Concerning the uniformization of the coding amount, the case in FIG. 7B, where the refresh area is set up in the longitudinal direction, makes it easier to perform the coding-amount control within the picture. Accordingly, this case brings about the higher actual realization.

When the image transmission is performed by using the refresh area like this, however, problems take place in some cases if an error has occurred on the transmission line. When the error has occurred in the stream, it is difficult to judge in which of the MBs the error has occurred. Here, the MBs are included inside a slice, i.e., the coding unit of the image. As a result of this difficulty, it turns out that all of the data inside the slice become unreliable reproduced images. In particular, in the coding scheme such as the H.264 which allows the high-compression implementation, the arithmetic coding scheme such as CABAC is used. Consequently, it is impossible to judge where an error occurs in the data. Namely, if this error has occurred inside the slice including the refresh area, there is a possibility that all of the images, to which the reference will be made hereinafter in this refresh area, may become errors.

In order to address these problems, it is effective to perform the slice-structure implementation of the refresh area, which will be explained hereinafter. A slice, which is defined by the standard (the H.264 coding), refers to a group of one or more MBs. Moreover, it is determined that, when the image is coded, the decoding is made executable with this group unit in the coding sequence. Incidentally, the coding side can determine with what type of unit the group should be formed.

Figure 2:
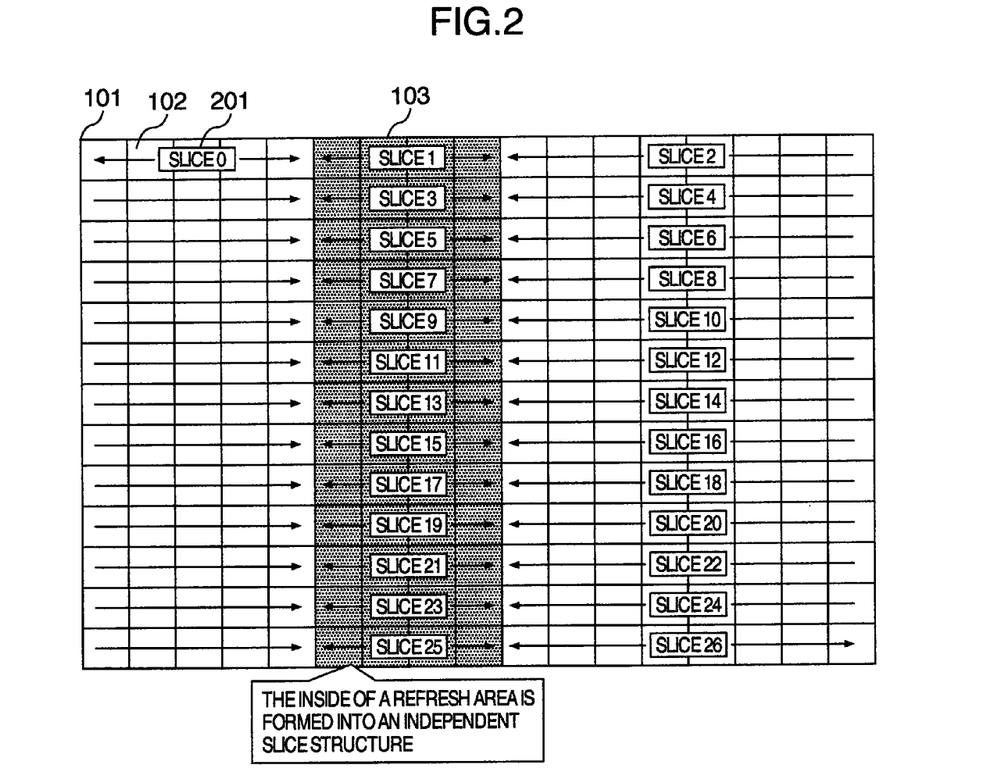
FIG. 2 is a diagram for illustrating an example of the slice structure where error-tolerant property is enhanced.

Hereinafter, referring to FIG. 2, the explanation will be given below concerning the slice structure where the error-tolerant property is enhanced. With respect to a certain one piece of image 101, FIG. 2 illustrates MBs 102, i.e., the coding unit, a refresh area 103 where a partial area of the image is forcefully formed into Intra MBs, and slice areas 201. When the gray-colored portion within the diagram is defined as the refresh area, the slice areas (i.e., slices 1, 3, 5, 7, 9, 11, 13, 15, 17, 19, 21, 23, and 25) are defined in a manner of surrounding the refresh area. As described earlier, the position of this refresh area is displaced on each image basis. Accordingly, the slice structure is also modified on each picture basis in the manner of enclosing the refresh area.

The employment of the slice structure like this makes it possible to reduce a possibility that an error will occur in the refresh area which becomes important in the reproduced-image generation. This reduction in the possibility allows the prevention of error propagation in the reproduced images. In particular, in the case of the low-delay image transmission, the I-pictures become unusable in many cases from the point-of-view of the rate smoothing. Consequently, this slice-structure implementation of the refresh area becomes significantly important.

Meanwhile, when seen from the point-of-view of the coding efficiency, the partition of an image into a large number of slices results in an increase in the partition information for representing the partition. Accordingly, there is an apprehension that the coding efficiency becomes lowered, and that the picture quality becomes deteriorated. This apprehension becomes a serious problem when the transmission rate of the transmission line is low, and when the image transmission is performed in a large image size. The width of the slice structure and the width of the refresh area are determined from the transmission rate and the coding efficiency. If, however, the refresh area is smaller than the width of the slice structure, the following problem occurs in addition to the above-described problem: Namely, when, in the Intra prediction inside the refresh area in a slice, the reference is made to an image existing in an area outside the refresh area, if an error has occurred in the image existing in the area outside the refresh area to which the reference had been made in the Inter prediction, this error is caused to intrude into the refresh area by the Intra prediction. What is conceivable from this problem is that the refresh area will not be decoded into a normal image, and that the resultant reproduced image will collapse.

Figure 1:
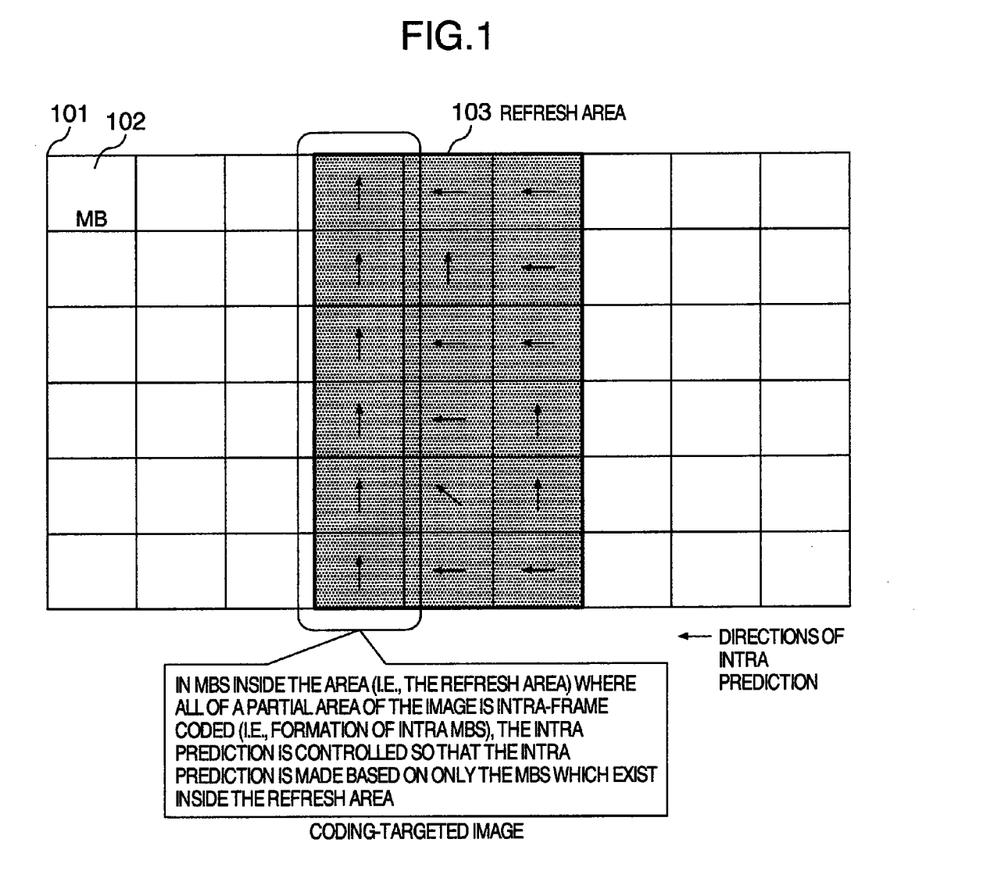
FIG. 1 is a conceptual diagram for explaining the mode selection of the Intra prediction.

The following two countermeasures are taken against the above-described problems:

The first countermeasure is as follows: If the area outside the refresh area is included in the slice including the refresh area, the prediction modes of the Intra prediction are selected so that the Intra prediction is made based on the pixels existing inside the refresh area. FIG. 1 is a conceptual diagram for explaining the mode selection of the Intra prediction. The coding-targeted image 101 is coded on each MB-102 basis. At this time, the refresh area 103, which is constituted with the plurality of Intra MBs, is set up. The Intra-prediction directions of the Intra MBs belonging to the refresh area 103 are controlled so that the reference is not made to the outside of the refresh area. In the drawing, the Intra-prediction directions of the leftmost Intra MBs of the refresh area 103 are controlled so that the reference is not made to the left of the refresh area.

In the H.264, the 8-pixel×8-pixel-size, 16-pixel×16-pixel-size, and 4-pixel×4-pixel-size Intra predictions are selectable on each MB basis. FIGS. 6A to 6I are conceptual diagrams for explaining the prediction modes of the 4-pixel×4-pixel Intra prediction. In the case of the 4-pixel×4-pixel Intra prediction, the inside of each 16-pixel×16-pixel-size MB is partitioned into 4-pixel×4-pixel-size sub blocks. Moreover, a prediction-targeted pixel of the coding target is predicted from a peripheral pixel at the same point-in-time on each sub-block basis. Then, the difference between the original pixel and the predicted pixel is coded. FIGS. 6A to 6I illustrate the 4-pixel×4-pixel prediction modes, where each white-colored pixel indicates the prediction-targeted pixel of the coding target, and each gray-colored pixel indicates an already-precoded peripheral pixel. In the Intra prediction, it turns out that the white-colored pixels inside are predicted using the gray-colored peripheral pixels. In the 4-pixel×4-pixel Intra prediction, nine types of prediction modes are defined, where the pixels and directions to be predicted differ from each other. For example, in the mode 0, the predicted value for a prediction-targeted pixel becomes equal to the value of a pixel positioned directly above the prediction-targeted pixel. In the mode 2, the predicted value becomes equal to an average value of the value of the directly-above-positioned pixel and that of the left-positioned pixel.

In this Intra prediction, the Intra prediction inside the refresh area is determined in such a manner that these gray-colored pixels do not become the pixels which exist outside the refresh area.

Figure 4A:
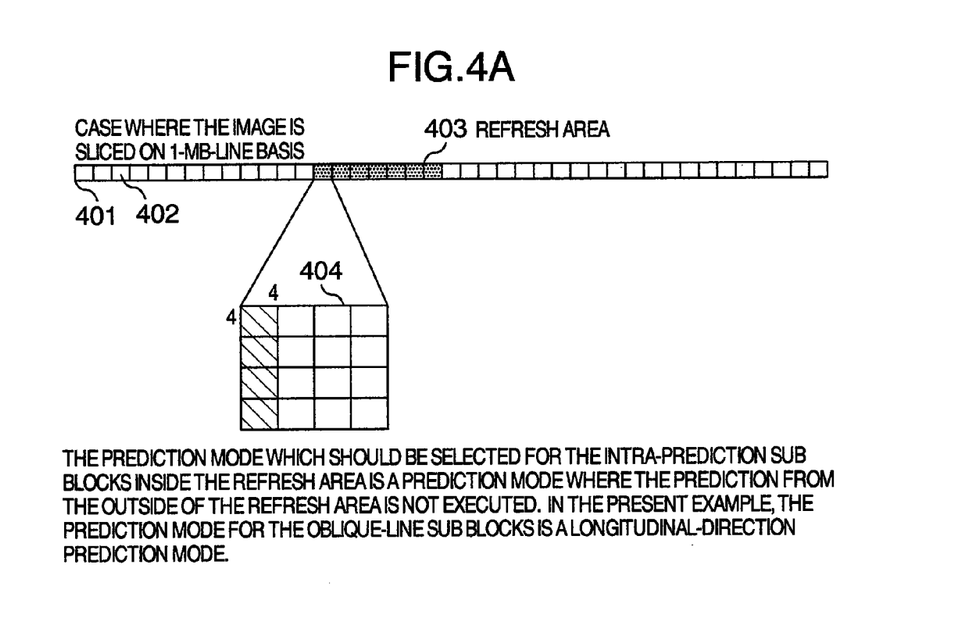
FIGS. 4A and 4B are diagrams for illustrating concrete examples of the Intra-prediction mode selection.

For example, in the case of FIG. 4A, in the 4×4 sub blocks existing inside a MB 404 which is in contact with the outside of the refresh area, with respect to the sub blocks for the prediction of which the outside of the refresh area is usable (i.e., the four oblique-line sub blocks in the MB 404), the mode 0, mode 3, or mode 7 is selected as their prediction mode so that the outside of the refresh area is unusable for the prediction.

Figure 4B:
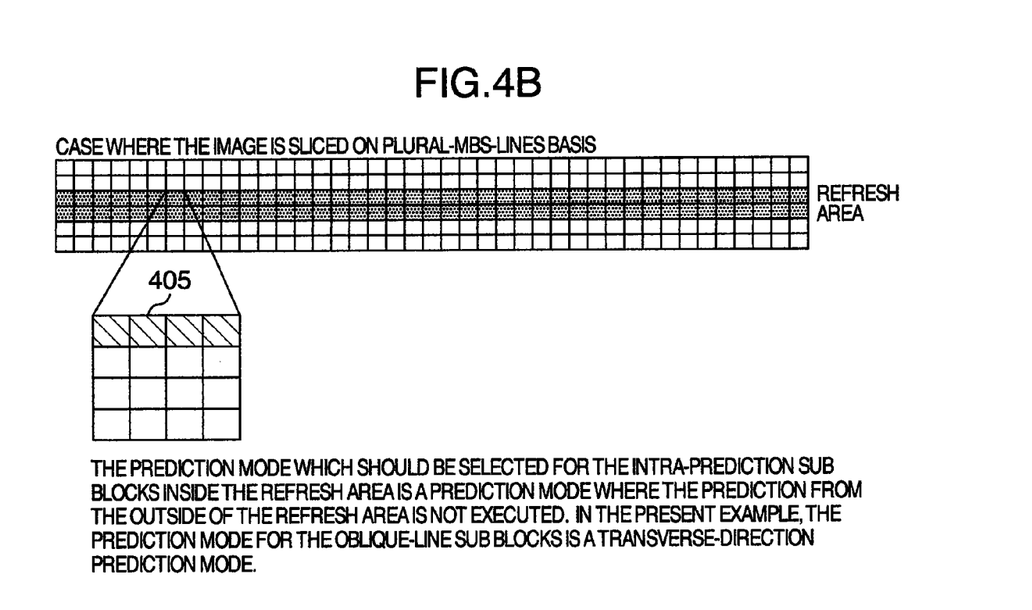

In the case of FIG. 4B, with respect to a MB 405 existing inside the refresh area, the prediction mode which is judged to be selected from basically the same concept is the transverse-direction prediction mode, i.e., the mode 1 or mode 8, where the pixels existing outside the refresh area are unusable for the prediction.

Even if an error is involved in a pixel existing outside the refresh area, the selection of the prediction mode like this makes it possible to prevent this error from being used for the prediction. This prevention of the error's being used for the prediction allows the refresh to be executed without fail.

The present example has been the example where the 4-pixel×4-pixel Intra prediction of the H.264 is made. In the 8-pixel×8-pixel or 16-pixel×16-pixel Intra prediction of the H.264, or in a different coding scheme, however, the employment of basically the same concept also makes it possible to prevent the propagation of an error due to the prediction from the outside of the refresh area. Also, it becomes possible to implement the error-tolerant property of the refresh area.

Also, it is conceivable that limiting the prediction mode results in a lowering in the compression efficiency, and that the resultant reproduced image becomes deteriorated only at the position of a MB whose prediction mode is limited. In order to address this problem, the quantization value is lowered with respect to the MB whose prediction mode is limited. This countermeasure makes it possible to heighten the quality of the reproduced image, thereby allowing prevention of the deterioration of the reproduced image.

Figure 5:
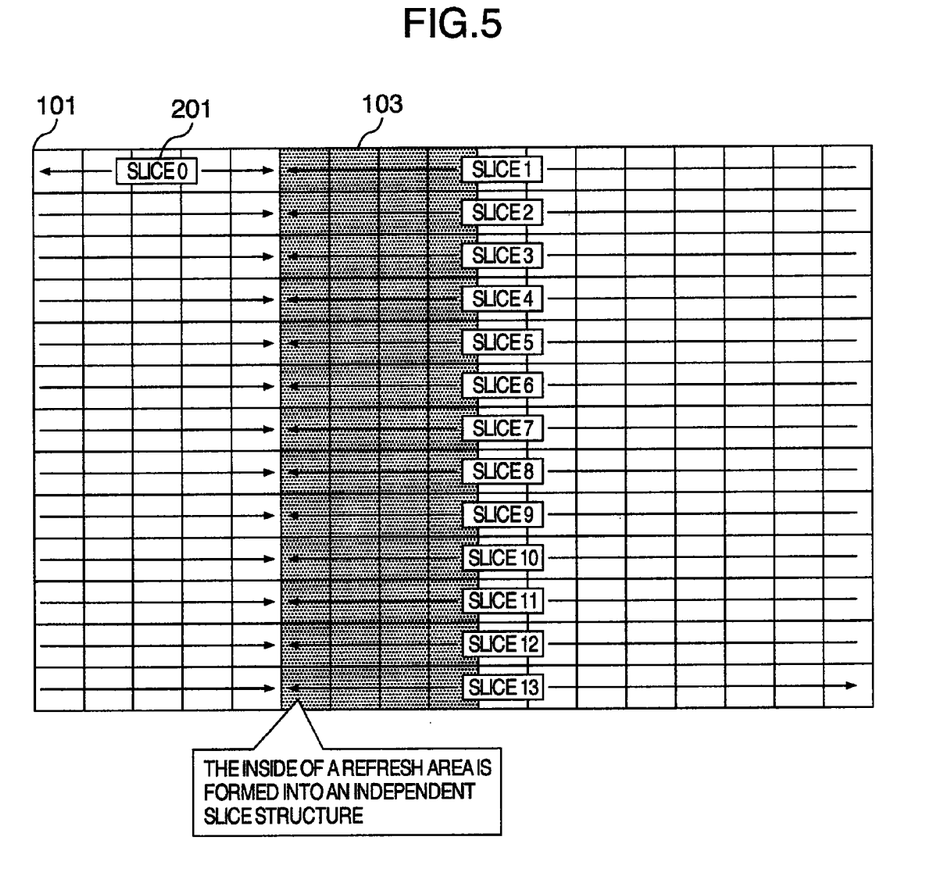
FIG. 5 is a diagram for illustrating an example of the slice structure where the error-tolerant property is enhanced.
Figure 6A:
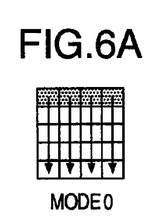
FIGS. 6A to 6I are conceptual diagrams for explaining the prediction modes of the Intra prediction.
Figure 6B:
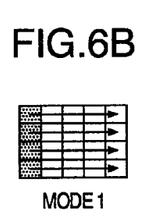
Figure 6C:
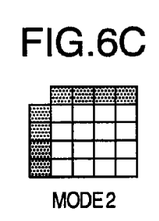
Figure 6D:
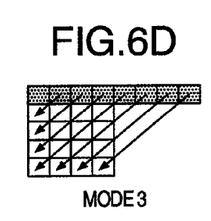
Figure 6E:
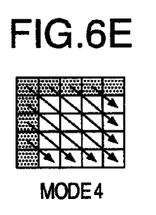
Figure 6F:
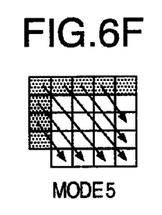
Figure 6G:
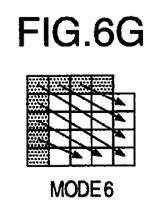
Figure 6H:
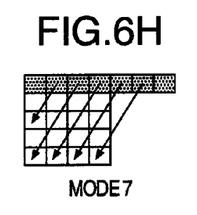
Figure 6I:
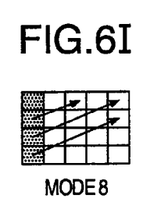

The second countermeasure against the collapse of the reproduced image is as follows: Namely, the slice structure is formed in order that the Intra prediction is not made based on the outside of the refresh area. In the Intra prediction, as illustrated in FIGS. 6A to 6I, the prediction is made from the left-direction and above-direction pixels. On account of this, as illustrated in FIG. 5, the slice structure is formed in such a manner that the front-head MBs of the refresh area become the front-head MBs of the slices (i.e., slices 1 to 13). Since the slice 0 exists at the front-head of the frame, the MB outside the refresh area becomes the front-head in the example in the drawing. If, however, the refresh area is started from the left end of the frame, the front-head slice 0 is also constituted with the MBs belonging to the refresh area.

The employment of the slice structure like this makes it possible to prevent an error from propagating from the outside of the refresh area into the inside of the refresh area with the use of the number of the slices which is equal to about the one-half as compared with the case of the slice structure illustrated in FIG. 2.

Next, the explanation will be given below concerning a problem that the use of the refresh area results in a difference in the picture quality, and that this picture-quality difference makes a step-difference emerge and appear. When the coding is performed with respect to a series of video images while displacing the refresh area, the difference in the picture quality between the refresh area and the outside of the refresh area makes the optical step-difference emerge and appear on the images. This step-difference, which is caused to occur by the difference between the Intra/Inter predictions, is more likely to be recognized along the boundary of the refresh area where a partial area of the images is forcefully Intra-frame coded.

Figure 9:
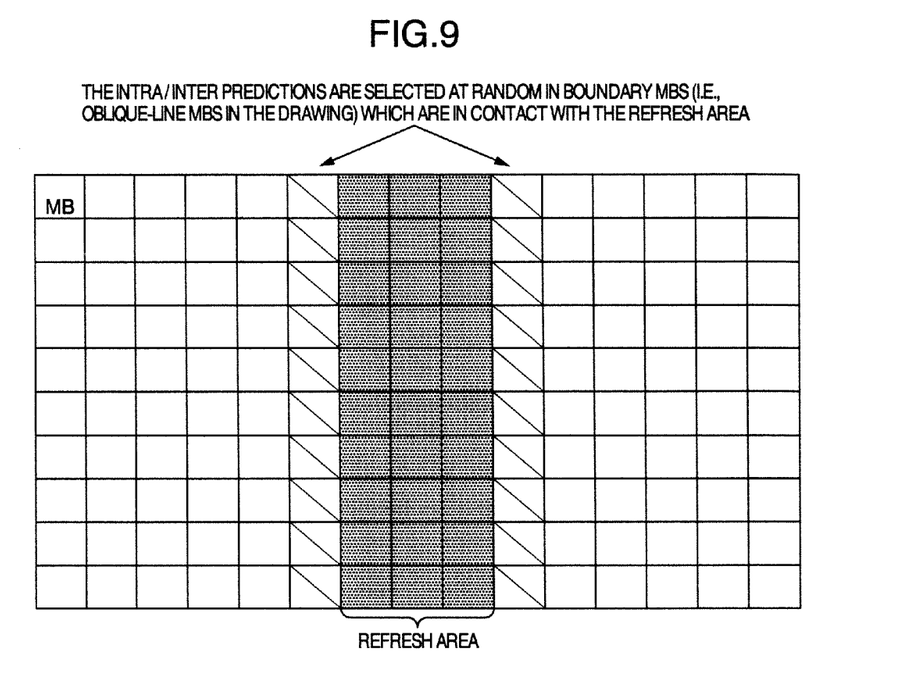
FIG. 9 is a diagram for illustrating an example of the countermeasure against an optical step-difference occurring from the picture-quality difference along a refresh area's boundary.

In order to address this problem, as illustrated in FIG. 9, the Intra/Inter predictions are selected at random with respect to the MBs which are in contact with the refresh area, and which exist outside the refresh area.

The employment of the above-described random selection prevents the Intra prediction from occurring in a fixed manner along the refresh area's boundary. This feature makes the along-boundary step-difference inconspicuous.

Figure 10:
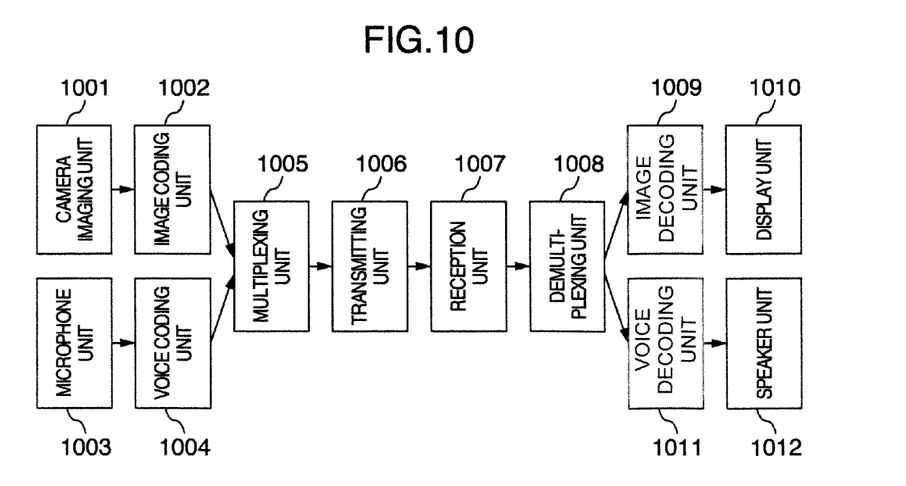
FIG. 10 is a diagram for illustrating a configuration example of an image transmission apparatus.

Next, the explanation will be given below concerning an image transmission apparatus where the present image coding apparatus is used. FIG. 10 illustrates a configuration example of this image transmission apparatus. An image is inputted from a camera imaging unit 1001, then being image-coded by an image coding unit 1002 for performing the low-delay image coding explained earlier. Voice information is inputted from a microphone unit 1003, then being voice-compressed by a voice coding unit 1004. The image-coded data and the voice-coded data are subjected to a multiplexing processing by a multiplexing unit 1005, then being transferred from a transmitting unit 1006 via wireless or wired communications. The multiplexed data transferred is received by a reception unit 1007, then being demultiplexed into the image information and the voice information by a demultiplexing unit 1008. The image data is converted into a display image by an image decoding unit 1009, then being displayed on a display by a display unit 1010. The voice data is converted into a reproduced voice by a voice decoding unit 1011, then being outputted from a speaker unit 1012.

Incidentally, in the configuration example in FIG. 10, the configuration where the voice is involved has been employed. In the case of transmitting the image alone, however, the control is performed in such a manner that the voice-related blocks are not used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image coding apparatus for coding an image, comprising:
   an image input unit;
   an Intra-prediction unit making Intra-prediction about an inputted image from the image input unit;
   an Inter-prediction unit making Inter-prediction about the inputted image from the image input unit; and
   a control unit controlling the image input unit, the Intra-prediction unit, and the Inter-prediction unit to perform the following functions:
   a refresh area is taken advantage of when a series of images are coded using Intra-frame coding and Inter-frame coding, a partial area of an image being forcefully Intra-frame coded (Intra MBs) in said refresh area, and
   as a prediction mode for prediction of said Intra MBs inside said refresh area, a prediction mode is selected where said prediction is executable based on only said image that exists inside said refresh area.

2. The image coding apparatus according to claim 1, wherein, in said Intra MBs inside said refresh area,
   quantization step size of a MB positioned at left end of said refresh area is made smaller than quantization values of other MBs inside said refresh area.

3. The image coding apparatus according to claim 1, wherein, even if a prediction has been made with respect to a MB existing outside said refresh area, said MB being positioned at left of said refresh area, a reference being made to stream-error information in said prediction, said stream-error information is prohibited from intruding into said refresh area.

4. The image coding apparatus according to claim 1, wherein said Intra-frame coding and said Inter-frame coding are selected at random with respect to MBs which are in contact with said refresh area, and which exist outside said refresh area.

5. An image transmission apparatus, comprising:
   said image coding apparatus according to claim 1;
   a camera imaging unit for acquiring the inputted image;
   a voice capturing/compressing unit for acquiring and compressing a voice;
   a multiplexing unit for multiplexing said voice and said video;
   a transmitting unit for transmitting said multiplexed data;
   a reception unit for receiving said multiplexed data;
   a demultiplexing unit for demultiplexing said voice and said video from said received data;
   a first decoding unit for decoding said video;
   a second decoding unit for decoding said voice;
   a display unit for displaying said decoded video; and
   a voice outputting unit for outputting said decoded voice.

6. An image coding method for coding an image, said image coding method, comprising the steps of:
   taking advantage of a refresh area when a series of images are coded using Intra-frame coding and Inter-frame coding, a partial area of an image being forcefully Intra-frame coded (Intra MBs) in said refresh area; and
   selecting, as a prediction mode for prediction of said Intra MBs inside said refresh area, a prediction mode where said prediction is executable based on only said image that exists inside said refresh area.

* * * * *